(12) United States Patent
Varanasi et al.

(10) Patent No.: US 12,452,314 B2
(45) Date of Patent: Oct. 21, 2025

(54) DYNAMICALLY RECONFIGURABLE TRAFFIC INSPECTION PIPELINE IN ZERO TRUST NETWORKS

(71) Applicant: Zscaler, Inc., San Jose, CA (US)

(72) Inventors: Kanti Varanasi, San Jose, CA (US); Jane Joseph, Leander, TX (US); Mohit Chawla, Punjab (IN); Nikhil Bhatia, San Jose, CA (US); Sunil Menon, Los Gatos, CA (US)

(73) Assignee: Zscaler, Inc., San Jose, CA (US)

( * ) Notice: Subject to any disclaimer, the term of this patent is extended or adjusted under 35 U.S.C. 154(b) by 235 days.

(21) Appl. No.: 18/309,953

(22) Filed: May 1, 2023

(65) Prior Publication Data
US 2024/0314176 A1  Sep. 19, 2024

(30) Foreign Application Priority Data
Mar. 17, 2023 (IN) .............................. 202311018238

(51) Int. Cl.
*H04L 9/40* (2022.01)
(52) U.S. Cl.
CPC .......... *H04L 63/30* (2013.01); *H04L 63/0428* (2013.01); *H04L 63/20* (2013.01)
(58) Field of Classification Search
CPC ...... H04L 63/30; H04L 63/0428; H04L 63/20
See application file for complete search history.

(56) References Cited

U.S. PATENT DOCUMENTS

| | | | | |
|---|---|---|---|---|
| 9,460,274 B1* | 10/2016 | Varanasi | ............... | G06F 21/604 |
| 11,089,047 B1* | 8/2021 | Kaushal | ............... | H04W 12/06 |
| 11,176,276 B1* | 11/2021 | Chen | ................... | H04L 63/1433 |
| 11,356,448 B1* | 6/2022 | Varanasi | ............. | H04L 63/0272 |
| 2012/0258777 A1* | 10/2012 | Huang | .................... | H04W 4/60 |
| | | | | 709/204 |
| 2019/0141015 A1* | 5/2019 | Nellen | ................ | H04L 63/0272 |
| 2019/0253388 A1* | 8/2019 | Verma | ..................... | H04L 63/20 |
| 2020/0137021 A1* | 4/2020 | Janakiraman | ....... | H04L 63/0281 |
| 2020/0137094 A1* | 4/2020 | Janakiraman | .......... | G06N 20/00 |
| 2020/0137115 A1* | 4/2020 | Janakiraman | .......... | H04L 43/028 |
| 2020/0236131 A1* | 7/2020 | Vejman | ..................... | G06N 3/08 |
| 2021/0234860 A1* | 7/2021 | Bansal | ................... | H04W 12/37 |
| 2021/0336934 A1* | 10/2021 | Deshmukh | ............ | H04L 63/105 |
| 2021/0344651 A1* | 11/2021 | Joshi | .................... | H04L 12/4641 |
| 2021/0360016 A1* | 11/2021 | Kaushal | ................ | H04L 67/535 |
| 2022/0046038 A1* | 2/2022 | Sinha | ................... | G06F 11/3072 |
| 2022/0078090 A1* | 3/2022 | Sinha | ................... | H04L 41/5009 |
| 2022/0103527 A1* | 3/2022 | Niemi | ................. | H04L 63/0281 |

(Continued)

*Primary Examiner* — Jimmy H Tran
(74) *Attorney, Agent, or Firm* — Baratta Law PLLC; Lawrence A. Baratta, Jr.

(57) ABSTRACT

Systems and methods for a dynamically reconfigurable traffic inspection pipeline in zero trust networks. Methods include steps of intercepting traffic traversing through a zero trust network to a destination; determining one or more traffic inspection stages to utilize for inspecting the traffic based on the characteristics of the traffic; creating a traffic inspection pipeline including the one or more traffic inspection stages; and performing the one or more traffic inspection stages on the traffic through the traffic inspection pipeline. The steps can include dynamically adding or removing traffic inspection stages in the traffic inspection pipeline after performing a traffic inspection stage.

18 Claims, 9 Drawing Sheets

(56) References Cited

U.S. PATENT DOCUMENTS

| | | | |
|---|---|---|---|
| 2022/0210173 A1* | 6/2022 | Katmor | H04L 63/1416 |
| 2022/0247761 A1* | 8/2022 | Subbanna | H04L 63/20 |
| 2022/0247769 A1* | 8/2022 | Erlingsson | G06F 9/5072 |
| 2022/0337557 A1* | 10/2022 | Head | H04L 63/0245 |
| 2022/0345484 A1* | 10/2022 | Drozd | H04W 4/40 |
| 2022/0353244 A1* | 11/2022 | Kahn | H04L 67/12 |
| 2023/0019448 A1* | 1/2023 | Deshmukh | H04L 63/1433 |
| 2023/0300153 A1* | 9/2023 | Christian | H04L 63/104 |
| | | | 726/22 |
| 2024/0022550 A1* | 1/2024 | Raghuram | H04L 63/062 |
| 2024/0080323 A1* | 3/2024 | Balmakhtar | H04L 41/16 |
| 2024/0106862 A1* | 3/2024 | Head | H04L 63/20 |
| 2024/0129278 A1* | 4/2024 | Andrews | H04L 63/08 |
| 2024/0163261 A1* | 5/2024 | Crabtree | H04L 9/3236 |
| 2024/0214350 A1* | 6/2024 | Sole | H04L 63/0807 |
| 2024/0291839 A1* | 8/2024 | Yagnik | H04L 51/214 |
| 2024/0348625 A1* | 10/2024 | Yadav | H04L 63/02 |
| 2025/0055871 A1* | 2/2025 | Kafzan | H04L 63/1433 |

* cited by examiner

DYNAMICALLY RECONFIGURABLE TRAFFIC INSPECTION PIPELINE IN ZERO TRUST NETWORKS

FIELD OF THE DISCLOSURE

The present disclosure relates generally to networking and computing. More particularly, the present disclosure relates to systems and methods for a dynamically reconfigurable traffic inspection pipeline in zero trust networks.

BACKGROUND OF THE DISCLOSURE

Traffic forwarding processes traditionally utilize firewalls or load balancer appliances to inspect traffic before the traffic is forwarded to the required destination. This requires specialized services which perform a variety of operations including classification, decryption, inspection, transformation, etc. Traditional methods of traffic forwarding and inspection also utilize static configurations of operation chains which are not dynamically configurable for specific types of traffic. The present disclosure provides systems and methods for dynamic traffic inspection pipelines which allow traffic specific operations to take place based on the traffic itself.

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include intercepting traffic traversing through a zero trust network to a destination; determining one or more traffic inspection stages to utilize for inspecting the traffic based on the characteristics of the traffic; creating a traffic inspection pipeline including the one or more traffic inspection stages; and performing the one or more traffic inspection stages on the traffic through the traffic inspection pipeline.

The steps can further include wherein the one or more traffic inspection stages include any of classification, decryption, inspection, and transformation. The one or more traffic inspection stages can be performed within a forwarding service of the zero trust network. One or more additional traffic inspection stages can be added to the traffic inspection pipeline after performing a traffic inspection stage. One or more traffic inspection stages can be removed from the traffic inspection pipeline after performing a traffic inspection stage. The traffic inspection pipeline is destroyed after the connection associated with the traffic is closed. The one or more traffic inspection stages can be determined based on control messages exchanged between traffic forwarding services.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Again, the present disclosure relates to systems and methods for a dynamically reconfigurable traffic inspection pipeline in zero trust networks. Various embodiments are adapted to create a traffic inspection pipeline which includes various stages. The stages can be dynamically configured and/or reconfigured based on the traffic which is being forwarded. The stages to be utilized are decided based on control messages exchanged between traffic forwarding services before the traffic is inspected. Because of the reconfigurable nature of the present traffic inspection pipeline, additional stages can be added dynamically after traffic classification.

Example Cloud-Based System Architecture

Figure 1A:
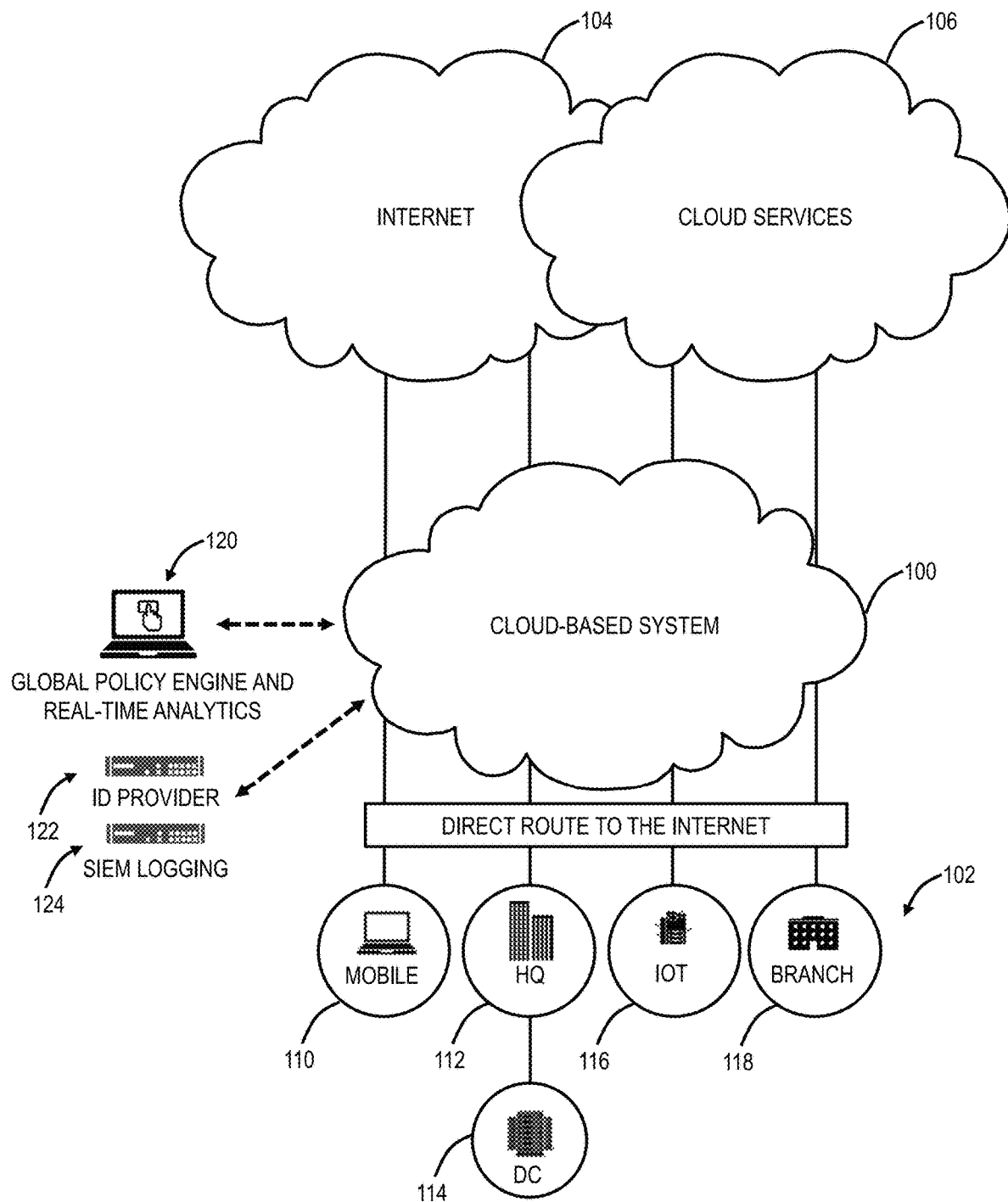
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
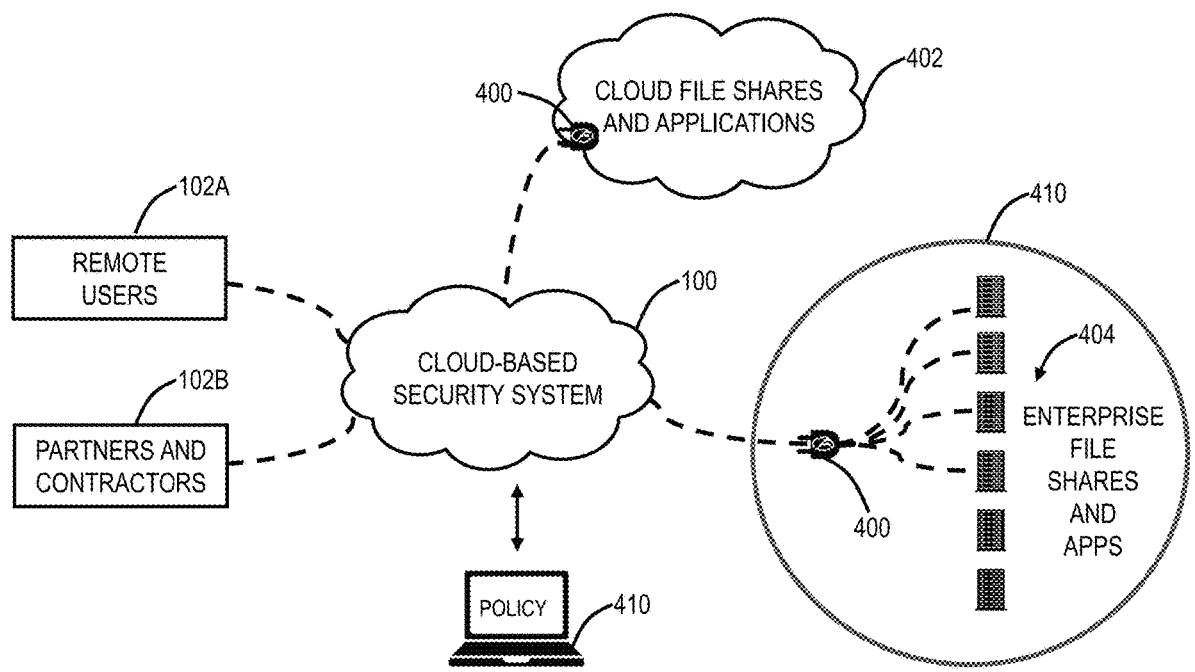
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
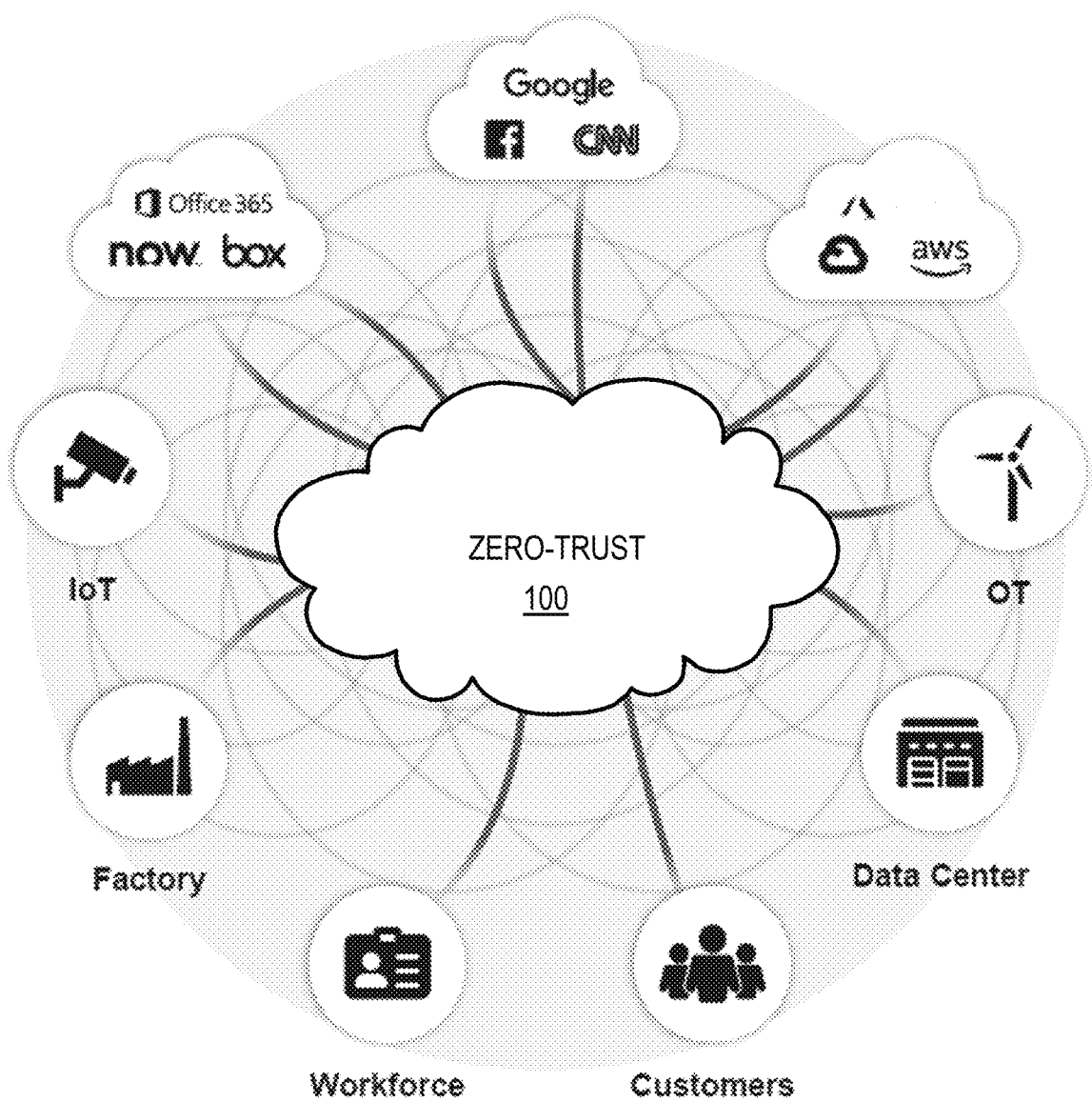
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its Core are Three Tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
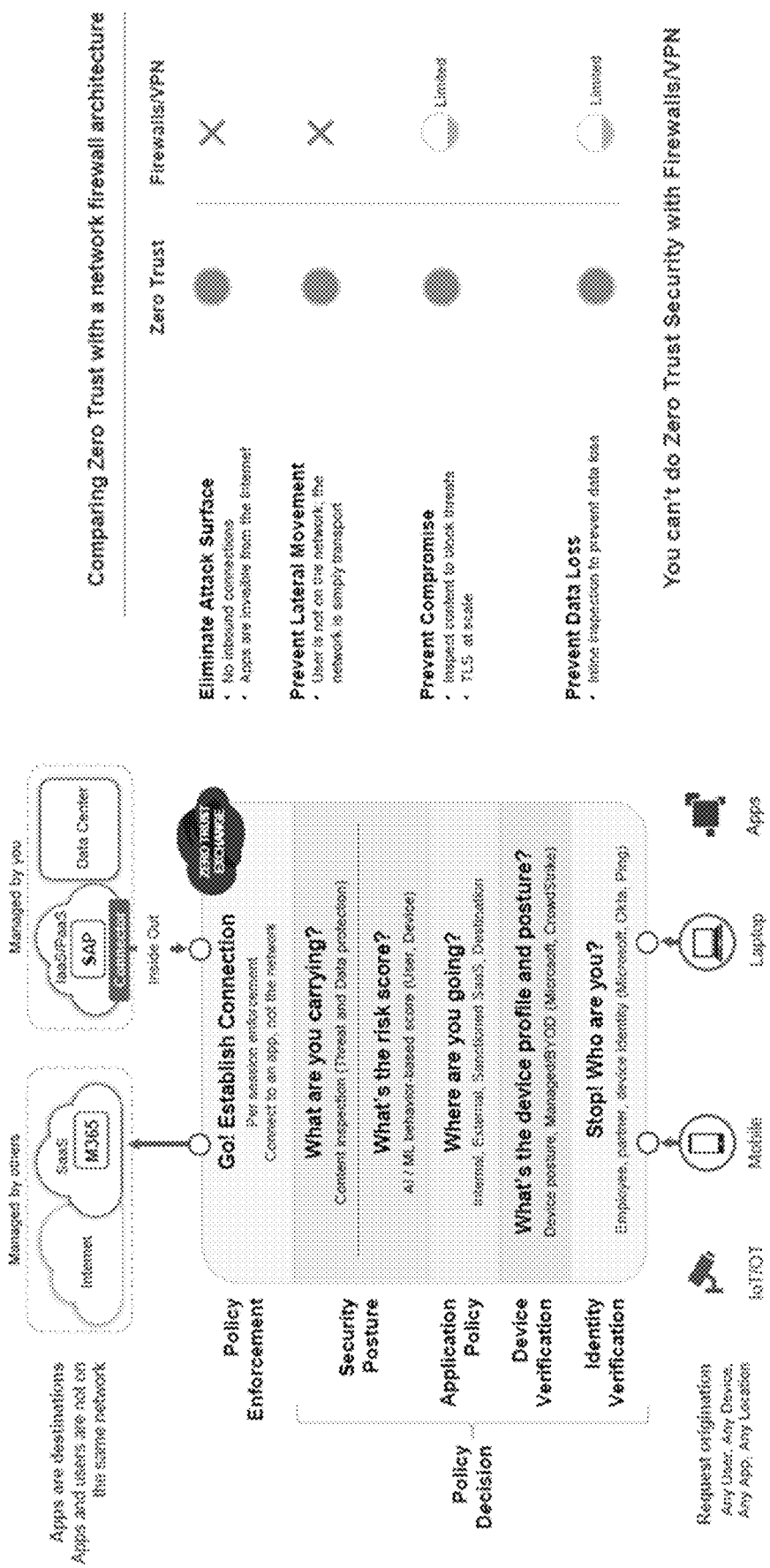
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
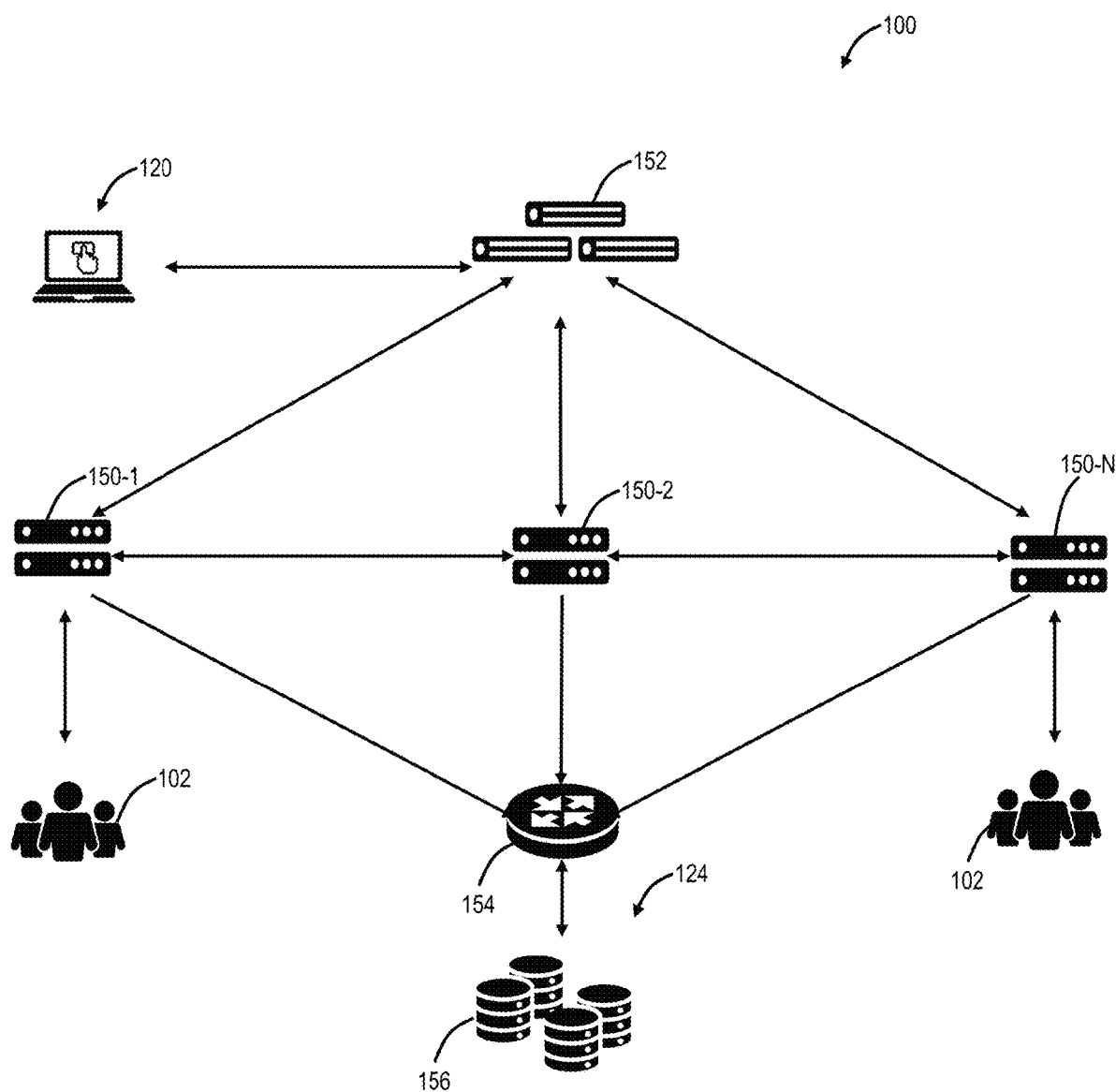
FIG. 2 is a network diagram of an example implementation of the cloud-based system.
Figure 4:
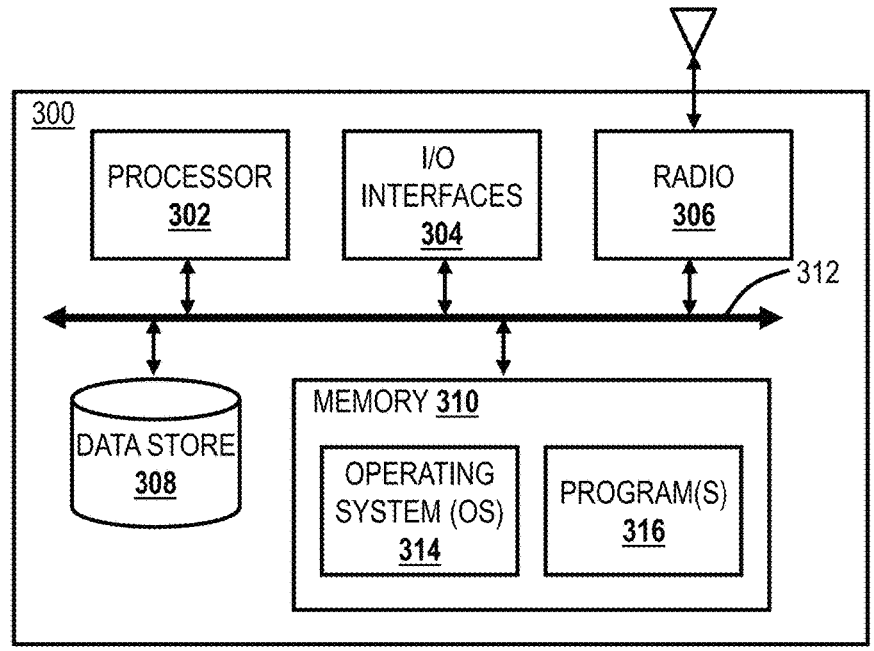

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
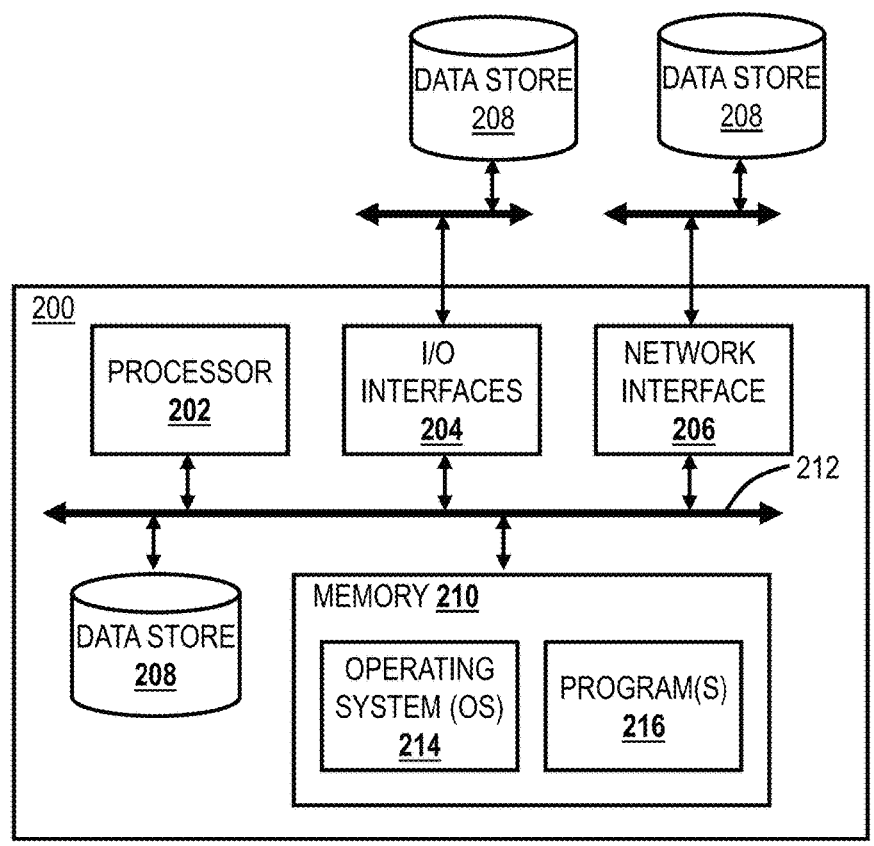
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
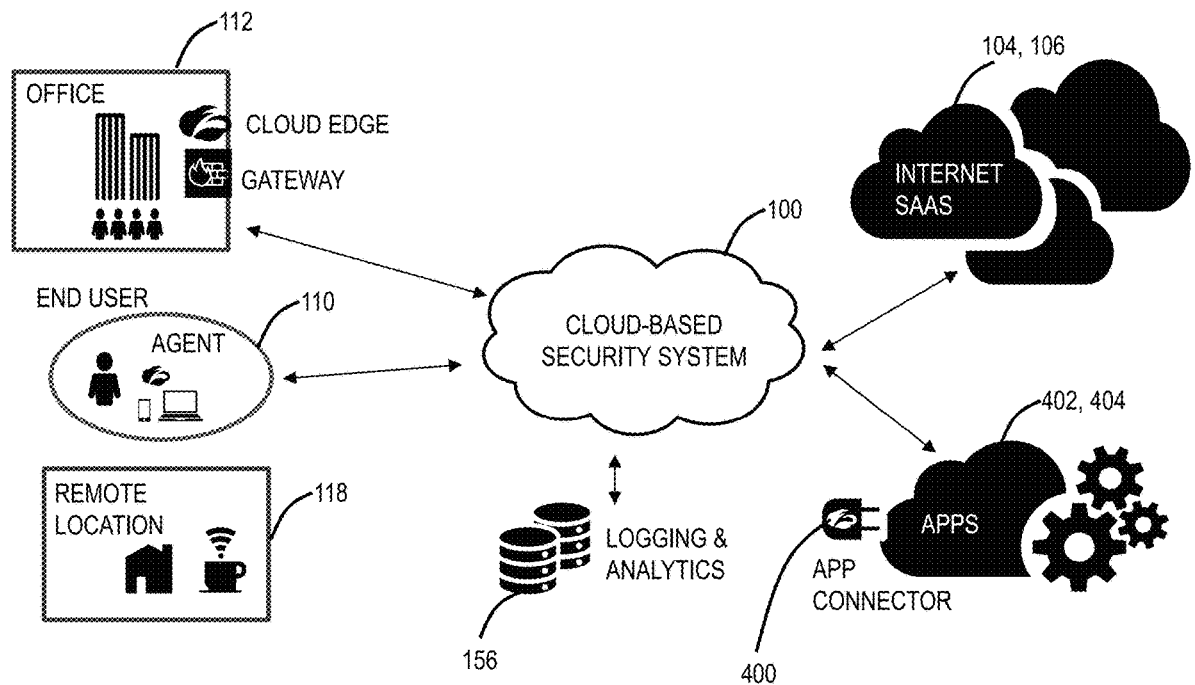
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10 G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
|---|---|
| Page Load Time | Redirect count (#) |
| Page Response Time | Throughput (bps) |
| Document Object Model (DOM) | Total size (bytes) |

| -continued | |
|---|---|
| Application-related data | |
| Load Time | |
| Total Downloaded bytes | Page error count (#) |
| App availability (%) | Page element count by category (#) |

| Network-related data | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Traffic Inspection Pipeline

The present disclosure provides a dynamically configurable and reconfigurable traffic inspection pipeline to be utilized in zero trust networks for forwarding traffic to a variety of destinations. Various embodiments are adapted to create a traffic inspection pipeline which includes various stages. The stages can be dynamically configured and/or reconfigured based on the traffic which is being inspected. The stages determined to be utilized are decided based on control messages exchanged between traffic forwarding services before the traffic is inspected. Because of the reconfigurable nature of the present traffic inspection pipeline, additional stages can be added dynamically after traffic classification.

The various stages can be determined based on characteristics of the traffic. For example, traffic which is encrypted may require a decryption stage. Similarly, a traffic transformation stage can be utilized if the destination requires a specific traffic structure and/or type. Thus, the stages determined to be useful in the traffic forwarding phase can be based on any of the type of traffic, origin of the traffic (i.e., the user or device which originated the traffic), and the destination of the traffic. In an embodiment, the stages determined to be included in the traffic inspection pipeline can also be determined based on policy.

In an embodiment, the stages disclosed herein can be defined as various stages of traffic inspection. The stages can include classification, decryption, inspection, and transformation. It will be appreciated that the present example depicts one of many embodiments of the present disclosure, where other embodiments can include various other stages of traffic inspection as needed or as decided by traffic forwarding services.

The traffic classification stage includes checking traffic against a database of well known traffic protocols. In this stage, the systems can determine if the traffic has already been previously classified. Thus, the protocol classification stage can be bypassed, for example, if traffic includes the same application and port combination as previously classified traffic.

The traffic decryption stage can be utilized in cases where classified traffic is encrypted. This stage can be preconfigured or dynamically added when such traffic is being inspected. If the traffic is encrypted with Secure Socket Layer (SSL), the traffic can be decrypted with a suitable certificate and private key pair.

For the traffic inspection stage, decrypted traffic is inspected and checked for vulnerabilities. In various embodiments, a signature database can be utilized to compare the traffic against in order to identify any potential vulnerabilities. Such a database can be managed and maintained by the operator of the system. Because of the dynamic capabilities of the present traffic inspection pipeline, specialized inspection can be performed based on the contents of the traffic. For example, Extensible Markup Language (XML) or JavaScript Object Notation (JSON) data can be parsed and checked for format and nesting sanity.

The traffic transformation stage can be utilized to modify traffic before it is forwarded to its final destination. Various transformations can be performed, such as re-encrypting traffic, HTTP header addition, traffic encoding, traffic compression, etc.

A zero trust network is adapted to provide connectivity for destinations that can utilize various protocols to send and receive data. Typically, an additional firewall or load balancer appliance is used to inspect traffic before it is forwarded to the destination. The present solution provides a software defined firewall to decrypt and inspect traffic within the forwarding plane of the zero trust network.

The typical solutions involve the use of specialized services and appliances to perform each of the stages described herein. Additionally, these solutions use a static approach to creating traffic inspection chains that cannot be dynamically altered based on the nature of the traffic, while also being deployed beyond the forwarding plane.

Figure 7:
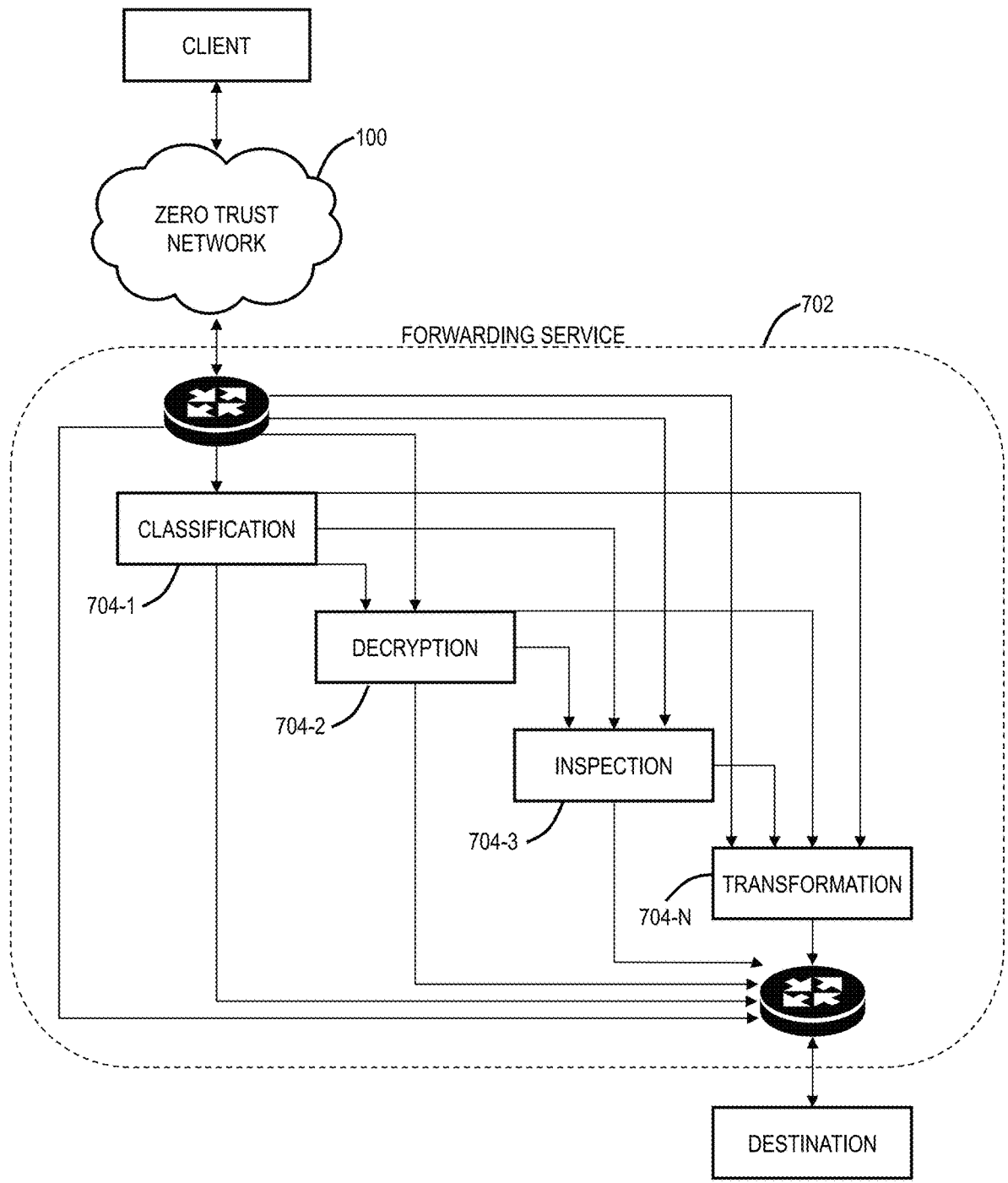
FIG. 7 is a diagram of a traffic inspection pipeline.

FIG. 7 is a diagram of a traffic inspection pipeline. Again, various embodiments of the present disclosure are adapted to create a traffic inspection pipeline which includes various traffic inspection stages 704 (stages), labeled as 704-1, 704-2, 704-3, 704-N, within a forwarding service 702. The stages 704 can be dynamically configured and/or reconfigured based on the traffic which is being inspected. The stages 704 which are determined to be needed are decided based on control messages exchanged between the traffic forwarding service 702 and the zero trust network 100 before the traffic is inspected. Again, because of the reconfigurable nature of the present traffic inspection pipeline, after various stages 704 have been selected, additional stages 704 can be added and/or removed dynamically.

Also, as seen in FIG. 7, the traffic inspection pipeline can include any number of stages 704. Similarly, various stages, or all stages, can be bypassed based on the traffic that is being forwarded, as shown by the various paths. It will be appreciated that the traffic inspection pipeline of the present disclosure can be utilized with traffic forwarding to any application or resource such as the applications, file shares, systems, etc. as described herein and also referred to as destinations. This includes applications and resources in the cloud as well as in private enterprise networks.

In an example, the various stages 704 can be combined in such a way that the traffic inspection pipeline is tailored to the specific traffic. If the traffic is deemed to be encrypted, unclassified, requiring vulnerability scanning, and potential transformation, then all of the mentioned stages can be deployed in the forwarding service for the traffic. In an embodiment, the configured pipeline is destroyed responsive to the connection associated with the traffic being closed. Because the traffic inspection pipeline is configurable and dynamically reconfigurable, if the traffic is unencrypted, then the decryption stage can be bypassed. Similarly, if the traffic does not require any transformation, then the transformation stage is excluded.

Again, it will be appreciated that examples depict only a few of many embodiments of the present disclosure, where other embodiments can include various other stages of traffic inspection as needed or as decided by traffic forwarding services. The other stages of traffic inspection can include any traffic inspection method known to one of skill in the art. Additionally, the examples explained herein show the traffic inspection stages in a particular order. It will be appreciated that the one or more traffic inspection stages can be assembled into the traffic inspection pipeline in any order as to optimize the traffic inspection.

Process for Dynamic Traffic Inspection

Figure 8:
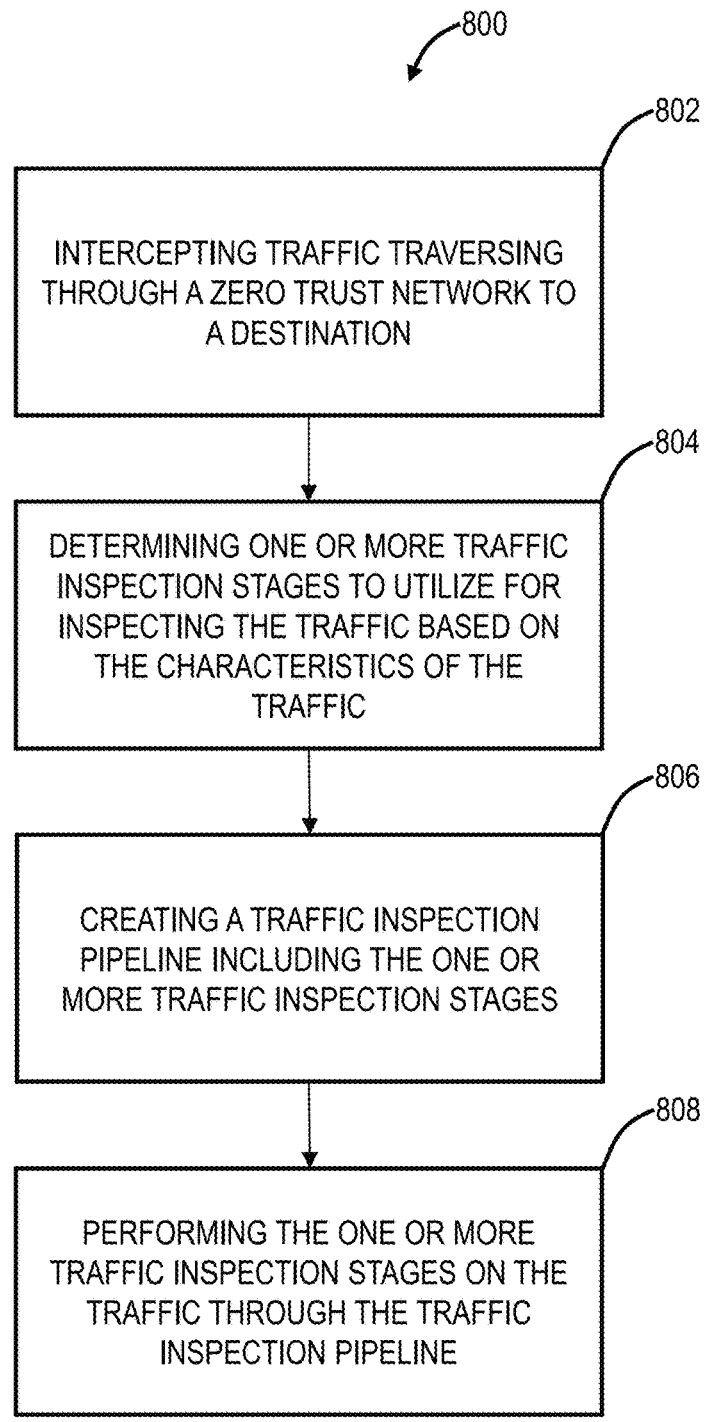
FIG. 8 is a flowchart of a process 800 for providing a dynamic traffic inspection pipeline.

FIG. 8 is a flowchart of a process 800 for providing a dynamic traffic inspection pipeline. The process 800 includes steps of intercepting traffic traversing through a zero trust network to a destination (step 802); determining one or more traffic inspection stages to utilize for inspecting the traffic based on the characteristics of the traffic (step 804); creating a traffic inspection pipeline including the one or more traffic inspection stages (step 806); and performing the one or more traffic inspection stages on the traffic through the traffic inspection pipeline (step 808).

The process 800 can further include wherein the one or more traffic inspection stages include any of classification, decryption, inspection, and transformation. The one or more traffic inspection stages can be performed within a forwarding service of the zero trust network. One or more additional traffic inspection stages can be added to the traffic inspection pipeline after performing a traffic inspection stage. One or more traffic inspection stages can be removed from the traffic inspection pipeline after performing a traffic inspection stage. The traffic inspection pipeline is destroyed after the connection associated with the traffic is closed. The one or more traffic inspection stages can be determined based on control messages exchanged between traffic forwarding services.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAS); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   intercepting traffic traversing through a zero trust network to a destination;
   determining one or more traffic inspection stages to utilize for inspecting the traffic based on characteristics of the traffic;
   creating a traffic inspection pipeline including the one or more traffic inspection stages; and
   performing the one or more traffic inspection stages on the traffic through the traffic inspection pipeline, wherein one or more additional traffic inspection stages are added to the traffic inspection pipeline after performing a traffic inspection stage.

2. The method of claim 1, wherein the one or more traffic inspection stages include any of classification, decryption, inspection, and transformation.

3. The method of claim 1, wherein the one or more traffic inspection stages are performed within a forwarding service of the zero trust network.

4. The method of claim 1, wherein one or more traffic inspection stages are removed from the traffic inspection pipeline after performing a traffic inspection stage.

5. The method of claim 1, wherein the traffic inspection pipeline is destroyed after a connection associated with the traffic is closed.

6. The method of claim 1, wherein the one or more traffic inspection stages are determined based on control messages exchanged between traffic forwarding services.

7. A method comprising steps of:
   intercepting traffic traversing through a zero trust network to a destination;
   determining one or more traffic inspection stages to utilize for inspecting the traffic based on characteristics of the traffic;
   creating a traffic inspection pipeline including the one or more traffic inspection stages; and
   performing the one or more traffic inspection stages on the traffic through the traffic inspection pipeline, wherein one or more traffic inspection stages are removed from the traffic inspection pipeline after performing a traffic inspection stage.

8. The method of claim 7, wherein the one or more traffic inspection stages include any of classification, decryption, inspection, and transformation.

9. The method of claim 7, wherein the one or more traffic inspection stages are performed within a forwarding service of the zero trust network.

10. The method of claim 7, wherein one or more additional traffic inspection stages are added to the traffic inspection pipeline after performing a traffic inspection stage.

11. The method of claim 7, wherein the traffic inspection pipeline is destroyed after a connection associated with the traffic is closed.

12. The method of claim 7, wherein the one or more traffic inspection stages are determined based on control messages exchanged between traffic forwarding services.

13. A method comprising steps of:
    intercepting traffic traversing through a zero trust network to a destination;
    determining one or more traffic inspection stages to utilize for inspecting the traffic based on characteristics of the traffic;
    creating a traffic inspection pipeline including the one or more traffic inspection stages; and
    performing the one or more traffic inspection stages on the traffic through the traffic inspection pipeline, wherein the traffic inspection pipeline is destroyed after a connection associated with the traffic is closed.

14. The method of claim 13, wherein the one or more traffic inspection stages include any of classification, decryption, inspection, and transformation.

15. The method of claim 13, wherein the one or more traffic inspection stages are performed within a forwarding service of the zero trust network.

16. The method of claim 13, wherein one or more additional traffic inspection stages are added to the traffic inspection pipeline after performing a traffic inspection stage.

17. The method of claim 13, wherein one or more traffic inspection stages are removed from the traffic inspection pipeline after performing a traffic inspection stage.

18. The method of claim 13, wherein the one or more traffic inspection stages are determined based on control messages exchanged between traffic forwarding services.

\* \* \* \* \*